(12) United States Patent
Steele et al.

(10) Patent No.: US 8,806,770 B2
(45) Date of Patent: Aug. 19, 2014

(54) TAPE MEASURE

(75) Inventors: Michael S. Steele, Waukesha, WI (US); Steven W. Hyma, Milwaukee, WI (US); Wade F. Burch, Wauwatosa, WI (US); Cheng Zhang Li, Colgate, WI (US); Scott R. Fischer, Menomonee Falls, WI (US); Abhijeet A. Khangar, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 199 days.

(21) Appl. No.: 13/561,773

(22) Filed: Jul. 30, 2012

(65) Prior Publication Data

US 2013/0025148 A1    Jan. 31, 2013

Related U.S. Application Data

(60) Provisional application No. 61/513,283, filed on Jul. 29, 2011, provisional application No. 61/607,060, filed on Mar. 6, 2012, provisional application No. 61/656,297, filed on Jun. 6, 2012.

(51) Int. Cl.
*G01B 3/10* (2006.01)

(52) U.S. Cl.
CPC ........ *G01B 3/1084* (2013.01); *G01B 2003/102* (2013.01); *G01B 3/1005* (2013.01)
USPC ............................................. 33/768; 33/761

(58) Field of Classification Search
CPC ...... G01B 3/10; G01B 3/1056; G01B 3/1071; G01B 3/1084
USPC .................... 33/759, 760, 761, 768, 769, 770
See application file for complete search history.

(56) References Cited

U.S. PATENT DOCUMENTS

| | | |
|---|---|---|
| 14,947 A | 5/1856 | Buck et al. |
| 1,303,756 A | 5/1919 | Ballou |
| 1,613,676 A | 1/1927 | Raphael |
| 2,052,259 A | 8/1936 | Stowell |
| 2,156,905 A | 5/1939 | Stowell et al. |
| 2,994,958 A | 8/1951 | Beeber |

(Continued)

FOREIGN PATENT DOCUMENTS

| | | |
|---|---|---|
| CN | 2174684 | 8/1994 |
| DE | 102006058396 A1 | 7/2008 |

(Continued)

OTHER PUBLICATIONS

Hyun-Kyu Ko, "A Study on Design of Measure Tape for Home Use (for DYI)" (1996) Master's Thesis-Kyung Sung University, Graduate School of Industry, Department of Industrial Design, 658.04 4 (81 pages with English translation).

*Primary Examiner* — G. Bradley Bennett
(74) *Attorney, Agent, or Firm* — Michael Best & Friedrich LLP

(57) ABSTRACT

A tape measure includes a housing assembly defining a cavity and a tape port from which to extend and retract a measuring tape. The measuring tape forms a spool rotatably coupled about an axis. A hook member is fixedly coupled to an end portion of the measuring tape. A U-shaped guard member extends from the housing assembly adjacent the tape port. The guard member is configured to engage the hook member when the measuring tape is retracted into the housing assembly.

20 Claims, 3 Drawing Sheets

(56) References Cited

U.S. PATENT DOCUMENTS

| | | | |
|---|---|---|---|
| 2,574,272 A | 11/1951 | McCully | |
| 2,614,769 A | 10/1952 | Nicholson | |
| 2,683,933 A | 7/1954 | McFarland | |
| 2,809,142 A * | 10/1957 | Sellen et al. | 33/770 |
| 2,816,369 A | 12/1957 | Becker | |
| 3,100,937 A | 8/1963 | Burch | |
| 3,164,907 A | 1/1965 | Quenot | |
| 3,214,836 A | 11/1965 | West | |
| 3,499,225 A | 3/1970 | Darrah | |
| 3,499,612 A | 3/1970 | Zelnick | |
| 3,519,219 A | 7/1970 | Zelnick | |
| 3,519,220 A | 7/1970 | Zelnick | |
| 3,521,831 A | 7/1970 | Schmidt | |
| 3,570,782 A | 3/1971 | Hayes | |
| 3,577,641 A | 5/1971 | Smith | |
| 3,578,259 A | 5/1971 | Zelnick | |
| 3,601,896 A * | 8/1971 | Ledene | 33/770 |
| 3,672,597 A | 6/1972 | Williamson | |
| 3,713,603 A | 1/1973 | Shore | |
| 3,716,201 A | 2/1973 | West | |
| 3,816,925 A | 6/1974 | Hogan et al. | |
| 3,838,520 A | 10/1974 | Quenot | |
| 3,869,096 A | 3/1975 | Hogan et al. | |
| 3,874,608 A | 4/1975 | Quenot | |
| 3,905,114 A | 9/1975 | Rutty | |
| 3,908,277 A | 9/1975 | Rutty | |
| 3,918,657 A | 11/1975 | Hawker et al. | |
| 3,942,738 A | 3/1976 | Rutty | |
| 4,067,513 A | 1/1978 | Rutty et al. | |
| 4,077,128 A | 3/1978 | Stoutenberg | |
| D247,878 S | 5/1978 | Covey | |
| 4,103,426 A | 8/1978 | Robin | |
| 4,121,785 A | 10/1978 | Quenot | |
| 4,131,244 A | 12/1978 | Quenot | |
| 4,142,693 A | 3/1979 | Czerwinski | |
| 4,149,320 A | 4/1979 | Troyer et al. | |
| 4,153,996 A | 5/1979 | Rutty | |
| 4,161,781 A | 7/1979 | Hildebrandt et al. | |
| 4,164,334 A | 8/1979 | Rathbun et al. | |
| 4,164,816 A | 8/1979 | Bergkvist | |
| D253,876 S | 1/1980 | Covey | |
| D253,877 S | 1/1980 | Covey et al. | |
| 4,186,490 A | 2/1980 | Quenot | |
| 4,200,983 A | 5/1980 | West et al. | |
| 4,215,828 A | 8/1980 | Rathbun et al. | |
| 4,215,829 A | 8/1980 | Boyllin | |
| D256,894 S | 9/1980 | Bruno | |
| D257,008 S | 9/1980 | Hildebrandt | |
| 4,286,387 A | 9/1981 | Di Diego | |
| 4,288,923 A | 9/1981 | Duda | |
| 4,363,171 A | 12/1982 | Scandella | |
| 4,411,072 A | 10/1983 | Rutty et al. | |
| 4,427,883 A | 1/1984 | Betensky et al. | |
| 4,429,462 A | 2/1984 | Rutty et al. | |
| 4,433,486 A | 2/1984 | Muehlenbein | |
| 4,434,952 A | 3/1984 | Czerwinski et al. | |
| 4,449,302 A | 5/1984 | Drechsler et al. | |
| 4,462,160 A | 7/1984 | Cohen | |
| 4,476,635 A | 10/1984 | Hart | |
| 4,479,617 A | 10/1984 | Edwards | |
| 4,487,379 A | 12/1984 | Drechsler et al. | |
| 4,489,494 A | 12/1984 | Duda | |
| 4,516,325 A | 5/1985 | Cohen et al. | |
| D279,553 S | 7/1985 | Drechsler | |
| 4,527,334 A | 7/1985 | Jones et al. | |
| 4,547,969 A | 10/1985 | Haack | |
| 4,574,486 A | 3/1986 | Drechsler | |
| 4,578,867 A | 4/1986 | Czerwinski et al. | |
| 4,583,294 A | 4/1986 | Hutchins et al. | |
| 4,603,481 A | 8/1986 | Cohen et al. | |
| 4,619,020 A | 10/1986 | Lecher, Sr. | |
| 4,748,746 A | 6/1988 | Jacoff | |
| 4,811,489 A | 3/1989 | Walker | |
| 4,860,901 A | 8/1989 | Hochreuther et al. | |
| 4,896,280 A | 1/1990 | Phillips | |
| 4,930,227 A | 6/1990 | Ketchpel | |
| 4,965,941 A | 10/1990 | Agostinacci | |
| 4,972,601 A | 11/1990 | Bickford et al. | |
| 4,982,910 A | 1/1991 | Bickford | |
| 4,998,356 A | 3/1991 | Chapin | |
| 4,999,924 A * | 3/1991 | Shields | 33/770 |
| 5,010,657 A | 4/1991 | Knapp | |
| 5,038,985 A | 8/1991 | Chapin | |
| 5,046,339 A | 9/1991 | Krell | |
| 5,062,215 A | 11/1991 | Schlitt | |
| 5,134,784 A | 8/1992 | Atienza | |
| D333,628 S | 3/1993 | Piotrkowski | |
| 5,189,801 A | 3/1993 | Nicely | |
| 5,208,767 A | 5/1993 | George-Kelso et al. | |
| 5,210,956 A | 5/1993 | Knispel et al. | |
| 5,230,158 A | 7/1993 | Wall | |
| D342,210 S | 12/1993 | Grossman | |
| D342,459 S | 12/1993 | Shen | |
| D342,687 S | 12/1993 | Kang | |
| 5,335,421 A | 8/1994 | Jones, Jr. | |
| D350,703 S | 9/1994 | Fifer | |
| 5,367,785 A | 11/1994 | Benarroch | |
| 5,448,837 A | 9/1995 | Hang-Teng | |
| D365,769 S | 1/1996 | Kang | |
| 5,481,813 A | 1/1996 | Templeton | |
| 5,506,378 A | 4/1996 | Goldenberg | |
| 5,531,395 A | 7/1996 | Hsu | |
| 5,542,184 A | 8/1996 | Beard | |
| D375,269 S | 11/1996 | Wertheim et al. | |
| 5,575,077 A | 11/1996 | Jung Tae | |
| 5,600,894 A | 2/1997 | Blackman et al. | |
| 5,659,970 A | 8/1997 | Reedy | |
| 5,699,623 A | 12/1997 | Lee | |
| 5,746,004 A | 5/1998 | Wertheim | |
| D396,816 S | 8/1998 | Kang | |
| D397,304 S | 8/1998 | Kang | |
| 5,791,581 A | 8/1998 | Loeffler et al. | |
| 5,794,357 A | 8/1998 | Gilliam et al. | |
| D397,626 S | 9/1998 | Davis | |
| D397,950 S | 9/1998 | Blackman et al. | |
| 5,806,202 A | 9/1998 | Blackman et al. | |
| 5,809,662 A * | 9/1998 | Skinner | 33/768 |
| 5,815,940 A | 10/1998 | Valentine, Sr. | |
| 5,820,057 A | 10/1998 | Decarolis et al. | |
| 5,829,152 A | 11/1998 | Potter et al. | |
| D402,216 S | 12/1998 | Gilliam et al. | |
| 5,842,284 A | 12/1998 | Goldman | |
| 5,845,412 A * | 12/1998 | Arcand | 33/770 |
| 5,875,557 A | 3/1999 | Ueki | |
| 5,884,408 A | 3/1999 | Simmons | |
| 5,894,677 A | 4/1999 | Hoffman | |
| 5,895,539 A | 4/1999 | Hsu | |
| D409,104 S | 5/1999 | Yang | |
| 5,913,586 A | 6/1999 | Marshall | |
| 5,922,999 A | 7/1999 | Yang | |
| D412,858 S | 8/1999 | Staton | |
| 5,990,435 A | 11/1999 | Chao | |
| 6,011,472 A | 1/2000 | Pendergraph et al. | |
| D420,606 S | 2/2000 | Hsu | |
| D421,230 S | 2/2000 | Gilliam et al. | |
| 6,026,585 A | 2/2000 | Li | |
| 6,032,379 A | 3/2000 | Usami | |
| D423,382 S | 4/2000 | Piotrkowski | |
| 6,052,914 A | 4/2000 | Soon | |
| D424,454 S | 5/2000 | Ikeda | |
| 6,082,017 A | 7/2000 | Simar | |
| 6,085,433 A | 7/2000 | Li | |
| 6,098,303 A | 8/2000 | Vogel | |
| 6,108,926 A | 8/2000 | Fraser et al. | |
| 6,115,933 A | 9/2000 | Li | |
| RE36,887 E | 10/2000 | Goldman | |
| 6,148,534 A | 11/2000 | Li | |
| 6,161,299 A | 12/2000 | Lin | |
| 6,167,635 B1 | 1/2001 | Lin | |
| 6,178,655 B1 | 1/2001 | Potter et al. | |
| D438,478 S | 3/2001 | Lin | |
| D439,531 S | 3/2001 | Davis et al. | |
| 6,209,219 B1 | 4/2001 | Wakefield et al. | |
| D441,308 S | 5/2001 | Davis | |

(56) References Cited

U.S. PATENT DOCUMENTS

| | | |
|---|---|---|
| D442,076 S | 5/2001 | Swanson |
| 6,237,243 B1 | 5/2001 | Cook |
| RE37,212 E | 6/2001 | Marshall et al. |
| 6,243,964 B1 | 6/2001 | Murray |
| 6,249,986 B1 | 6/2001 | Murray |
| D447,069 S | 8/2001 | Budrow |
| 6,272,764 B1 | 8/2001 | Lin |
| 6,276,071 B1 | 8/2001 | Khachatoorian |
| D447,712 S | 9/2001 | Hsu |
| 6,282,808 B1 | 9/2001 | Murray |
| 6,308,432 B1 | 10/2001 | Gilliam et al. |
| D451,041 S | 11/2001 | Chen |
| 6,324,769 B1 | 12/2001 | Murray |
| 6,338,204 B1 | 1/2002 | Howle |
| D453,303 S | 2/2002 | Lin |
| 6,349,482 B1 | 2/2002 | Gilliam |
| 6,367,161 B1 | 4/2002 | Murray et al. |
| D458,163 S | 6/2002 | Kang |
| D458,550 S | 6/2002 | Hsu |
| 6,431,486 B1 | 8/2002 | Lee |
| D463,300 S | 9/2002 | Li |
| 6,442,863 B1 | 9/2002 | Poineau et al. |
| 6,449,866 B1 | 9/2002 | Murray |
| D464,277 S | 10/2002 | Traver, III |
| D464,579 S | 10/2002 | Martone |
| 6,470,582 B1 | 10/2002 | Renko |
| 6,470,590 B1 | 10/2002 | Lee |
| 6,490,809 B1 | 12/2002 | Li |
| 6,497,050 B1 | 12/2002 | Ricalde |
| 6,499,226 B1 | 12/2002 | Reda et al. |
| D469,704 S | 2/2003 | Williams et al. |
| RE38,032 E | 3/2003 | Butwin |
| D471,473 S | 3/2003 | Blackman et al. |
| D471,827 S | 3/2003 | Ranieri et al. |
| 6,530,159 B2 | 3/2003 | Traver, III |
| 6,543,144 B1 | 4/2003 | Morin |
| 6,546,644 B2 | 4/2003 | Poineau et al. |
| D474,412 S | 5/2003 | Ichinose et al. |
| 6,568,099 B2 | 5/2003 | Bergeron |
| D476,913 S | 7/2003 | Blackman et al. |
| 6,595,451 B1 | 7/2003 | Kang et al. |
| 6,598,310 B1 | 7/2003 | Odachowski |
| 6,637,124 B2 | 10/2003 | Pederson |
| 6,637,126 B2 | 10/2003 | Balota |
| 6,643,947 B2 | 11/2003 | Murray |
| D485,770 S | 1/2004 | Lee |
| D486,086 S | 2/2004 | Jueneman |
| 6,684,522 B2 | 2/2004 | Chilton |
| 6,688,010 B1 | 2/2004 | Schwaerzler |
| 6,691,426 B1 | 2/2004 | Lee et al. |
| 6,694,622 B2 | 2/2004 | Kim |
| 6,698,679 B1 | 3/2004 | Critelli et al. |
| 6,718,649 B1 | 4/2004 | Critelli et al. |
| 6,760,979 B1 | 7/2004 | Hsu |
| 6,796,052 B1 | 9/2004 | Lin |
| 6,804,899 B2 | 10/2004 | Murray |
| 6,811,109 B1 | 11/2004 | Blackman et al. |
| 6,836,975 B2 | 1/2005 | Lin |
| 6,839,981 B2 | 1/2005 | Rafter |
| 6,854,197 B2 | 2/2005 | Knight |
| D503,351 S | 3/2005 | Chen |
| D503,637 S | 4/2005 | Noel |
| D503,897 S | 4/2005 | Lin |
| 6,874,245 B2 | 4/2005 | Liu |
| D504,628 S | 5/2005 | Weeks et al. |
| D504,835 S | 5/2005 | Snider |
| D504,836 S | 5/2005 | Wang |
| 6,892,468 B2 | 5/2005 | Murray |
| 6,904,697 B2 | 6/2005 | Zars |
| D507,195 S | 7/2005 | Kondo et al. |
| 6,918,191 B2 | 7/2005 | Stauffer et al. |
| 6,920,700 B2 | 7/2005 | Ekdahl et al. |
| 6,931,734 B2 | 8/2005 | Elder et al. |
| 6,931,753 B2 | 8/2005 | Ryals et al. |
| 6,935,045 B2 | 8/2005 | Cubbedge |
| 6,938,354 B2 | 9/2005 | Worthington |
| 6,944,961 B2 | 9/2005 | Carroll |
| 6,959,499 B2 | 11/2005 | Bini |
| 6,962,002 B2 | 11/2005 | Panosian |
| D514,962 S | 2/2006 | Armendariz |
| 6,996,915 B2 | 2/2006 | Ricalde |
| 7,024,791 B2 | 4/2006 | Marshall et al. |
| D522,890 S | 6/2006 | Huang |
| 7,055,260 B1 | 6/2006 | Hoffman |
| 7,057,484 B2 | 6/2006 | Gilmore |
| 7,059,061 B2 | 6/2006 | French |
| 7,086,174 B2 * | 8/2006 | Scarborough .................... 33/768 |
| 7,131,214 B1 | 11/2006 | Blackman et al. |
| 7,131,215 B2 | 11/2006 | Kang |
| D535,900 S | 1/2007 | McKinney |
| 7,159,331 B2 | 1/2007 | Critelli et al. |
| 7,168,182 B2 | 1/2007 | Kilpatrick et al. |
| 7,174,655 B1 | 2/2007 | Gibbons et al. |
| 7,174,656 B1 | 2/2007 | Smith |
| 7,178,257 B2 | 2/2007 | Kang et al. |
| 7,185,446 B1 | 3/2007 | King |
| D540,207 S | 4/2007 | Ikeda |
| 7,234,246 B1 | 6/2007 | Rhead |
| RE39,719 E | 7/2007 | Murray |
| D545,701 S | 7/2007 | Cooper |
| D547,681 S | 7/2007 | Nelson et al. |
| 7,240,439 B2 | 7/2007 | Critelli et al. |
| 7,266,905 B1 * | 9/2007 | Lee et al. ......................... 33/768 |
| 7,284,339 B1 | 10/2007 | Campbell et al. |
| 7,299,565 B2 | 11/2007 | Marshall et al. |
| D557,155 S | 12/2007 | Sa'ar |
| D558,620 S | 1/2008 | Critelli et al. |
| D560,522 S | 1/2008 | Farnworth et al. |
| 7,334,344 B2 | 2/2008 | Scarborough |
| 7,343,694 B2 | 3/2008 | Erdfarb |
| D565,441 S | 4/2008 | Critelli |
| D565,442 S | 4/2008 | Critelli |
| 7,353,619 B2 | 4/2008 | Gibbons et al. |
| 7,363,723 B1 | 4/2008 | Peterson |
| 7,377,050 B2 | 5/2008 | Shute et al. |
| 7,398,604 B2 | 7/2008 | Murray |
| 7,406,778 B2 | 8/2008 | Lee et al. |
| 7,415,777 B2 | 8/2008 | Campbell et al. |
| 7,415,778 B1 | 8/2008 | McEwan et al. |
| D579,359 S | 10/2008 | Critelli et al. |
| 7,434,330 B2 | 10/2008 | McEwan et al. |
| 7,454,845 B2 | 11/2008 | Wise |
| D582,810 S | 12/2008 | Cook |
| 7,458,537 B2 | 12/2008 | Critelli et al. |
| 7,475,842 B2 | 1/2009 | Campbell |
| 7,487,600 B1 | 2/2009 | Cooper |
| 7,490,414 B2 | 2/2009 | Critelli et al. |
| 7,490,415 B1 | 2/2009 | Cubbedge |
| D590,283 S | 4/2009 | Critelli et al. |
| D590,284 S | 4/2009 | Critelli et al. |
| 7,555,845 B2 | 7/2009 | Critelli et al. |
| 7,559,154 B2 | 7/2009 | Levine et al. |
| 7,565,751 B2 | 7/2009 | Murray |
| 7,594,341 B2 | 9/2009 | Erdfarb |
| D603,248 S | 11/2009 | Bar-Erez |
| 7,617,616 B1 | 11/2009 | Berg |
| 7,627,958 B2 | 12/2009 | Tallon et al. |
| 7,631,437 B2 | 12/2009 | Sanderson |
| D611,849 S | 3/2010 | Cook et al. |
| 7,669,347 B1 | 3/2010 | Huang |
| D613,629 S | 4/2010 | Suzuki |
| D614,516 S | 4/2010 | Capra |
| 7,703,216 B2 | 4/2010 | Huang |
| D617,224 S | 6/2010 | Delneo et al. |
| 7,805,855 B2 | 10/2010 | Seo |
| 7,845,093 B2 | 12/2010 | Smiroldo |
| 7,846,673 B2 | 12/2010 | Pastorek et al. |
| 7,854,074 B2 | 12/2010 | Zhou |
| 7,913,406 B2 | 3/2011 | Norelli |
| 7,918,037 B1 | 4/2011 | Polkhovskiy |
| 7,987,611 B2 | 8/2011 | Taylor |
| 8,015,723 B2 | 9/2011 | Solomon |
| 8,056,849 B2 | 11/2011 | Ng et al. |
| 8,081,815 B2 | 12/2011 | Kotake et al. |

(56) References Cited

U.S. PATENT DOCUMENTS

| | | |
|---|---|---|
| D653,974 S | 2/2012 | Capra |
| 8,117,762 B2 | 2/2012 | Delneo et al. |
| 8,117,763 B2 | 2/2012 | Delneo et al. |
| D660,735 S | 5/2012 | Petrillo |
| 8,215,027 B2 | 7/2012 | Kang |
| 8,375,595 B2 | 2/2013 | Murray et al. |
| 8,381,411 B2 | 2/2013 | Delarosa et al. |
| 8,407,909 B2 | 4/2013 | Lindsay |
| 2001/0003872 A1 | 6/2001 | Pederson |
| 2001/0042315 A1 | 11/2001 | Dixon |
| 2002/0011008 A1 | 1/2002 | Nelson et al. |
| 2002/0066193 A1 | 6/2002 | Hodge |
| 2002/0066774 A1 | 6/2002 | Prochac |
| 2002/0073570 A1 | 6/2002 | Conder |
| 2003/0009899 A1 | 1/2003 | Ha |
| 2003/0019116 A1 | 1/2003 | DeWall |
| 2003/0019123 A1 | 1/2003 | Lin |
| 2003/0070315 A1 | 4/2003 | Bergeron |
| 2003/0213141 A1 | 11/2003 | Lin |
| 2003/0233762 A1 | 12/2003 | Blackman et al. |
| 2004/0044438 A1 | 3/2004 | Lorraine et al. |
| 2004/0055174 A1 | 3/2004 | Hirsch, Jr. |
| 2004/0071869 A1 | 4/2004 | Gilliam et al. |
| 2004/0088875 A1 | 5/2004 | Lee et al. |
| 2004/0163267 A1 | 8/2004 | Bini |
| 2004/0163271 A1 | 8/2004 | Zars |
| 2004/0163272 A1 | 8/2004 | Knight |
| 2005/0005470 A1 | 1/2005 | Snider |
| 2005/0028396 A1 | 2/2005 | Stauffer et al. |
| 2005/0155244 A1 | 7/2005 | Ryals et al. |
| 2005/0155245 A1 | 7/2005 | Panosian |
| 2005/0252020 A1 | 11/2005 | Critelli et al. |
| 2005/0252021 A1 | 11/2005 | Kang |
| 2006/0005417 A1* | 1/2006 | Rhead .................. 33/769 |
| 2006/0010705 A1 | 1/2006 | Dettellis |
| 2006/0096112 A1 | 5/2006 | Berring |
| 2006/0096113 A1 | 5/2006 | Kang et al. |
| 2006/0107546 A1 | 5/2006 | Pritchard |
| 2006/0112582 A1* | 6/2006 | Scarborough ............ 33/668 |
| 2006/0130352 A1 | 6/2006 | Huang |
| 2006/0185185 A1 | 8/2006 | Scarborough |
| 2006/0230627 A1 | 10/2006 | Blackman et al. |
| 2006/0248742 A1 | 11/2006 | Marshall et al. |
| 2006/0283036 A1 | 12/2006 | Huang |
| 2007/0017111 A1 | 1/2007 | Hoback et al. |
| 2007/0056182 A1 | 3/2007 | Di Bitonto et al. |
| 2007/0079520 A1 | 4/2007 | Levine et al. |
| 2007/0152091 A1 | 7/2007 | Campbell |
| 2007/0171630 A1 | 7/2007 | Gibbons et al. |
| 2007/0227028 A1 | 10/2007 | Campbell et al. |
| 2008/0028628 A1 | 2/2008 | Campbell et al. |
| 2008/0086902 A1 | 4/2008 | Murray |
| 2008/0086903 A1 | 4/2008 | Peterson |
| 2008/0086904 A1 | 4/2008 | Murray |
| 2008/0285854 A1 | 11/2008 | Kotake et al. |
| 2009/0064517 A1 | 3/2009 | Sanderson |
| 2009/0064525 A1 | 3/2009 | Chen |
| 2009/0064526 A1 | 3/2009 | Farnworth et al. |
| 2009/0249636 A1 | 10/2009 | Reda et al. |
| 2010/0139110 A1 | 6/2010 | Germain |
| 2010/0314277 A1 | 12/2010 | Murray |
| 2010/0325910 A1 | 12/2010 | Huang |
| 2011/0005094 A1 | 1/2011 | Solomon |
| 2011/0138642 A1 | 6/2011 | Norelli |
| 2011/0179661 A1 | 7/2011 | Delneo et al. |
| 2011/0179663 A1 | 7/2011 | Kang |
| 2011/0179664 A1 | 7/2011 | Delneo et al. |
| 2012/0036727 A1 | 2/2012 | McCarthy |
| 2012/0055038 A1 | 3/2012 | Lindsay |
| 2012/0073156 A1 | 3/2012 | DeLaRosa et al. |
| 2012/0159799 A1 | 6/2012 | Murray et al. |
| 2012/0167403 A1 | 7/2012 | Roeske |
| 2013/0025147 A1 | 1/2013 | Steele et al. |
| 2013/0047455 A1 | 2/2013 | Steele et al. |
| 2013/0185949 A1 | 7/2013 | Burch et al. |

FOREIGN PATENT DOCUMENTS

| | | |
|---|---|---|
| DE | 102006058396 B4 | 6/2011 |
| EP | 66322 | 10/1986 |
| EP | 0199430 | 10/1986 |
| EP | 531570 | 3/1993 |
| EP | 427932 | 2/1996 |
| EP | 0724133 | 7/1996 |
| EP | 0896200 A2 | 2/1999 |
| EP | 0896200 A3 | 12/1999 |
| EP | 1074813 | 2/2001 |
| EP | 1175840 | 1/2002 |
| EP | 1411319 | 4/2004 |
| EP | 1144947 | 9/2004 |
| EP | 1469276 | 10/2004 |
| EP | 1104542 | 12/2004 |
| EP | 1553382 | 7/2005 |
| EP | 0922196 | 11/2005 |
| EP | 1647797 | 4/2006 |
| EP | 1237431 | 10/2006 |
| EP | 1914508 | 4/2008 |
| EP | 1914509 | 4/2008 |
| EP | 2469218 | 6/2012 |
| GB | 690458 | 4/1953 |
| JP | 1961002384 | 2/1961 |
| JP | 1983134704 | 9/1983 |
| JP | 10332301 | 12/1998 |
| KR | 19840001901 | 9/1984 |
| KR | 19910004712 | 11/1991 |
| WO | WO 9402799 | 2/1994 |
| WO | WO 9714541 | 4/1997 |
| WO | WO 98/09133 | 3/1998 |
| WO | WO 9811402 | 3/1998 |
| WO | WO 98/23524 | 6/1998 |
| WO | WO 99/23447 | 5/1999 |
| WO | WO 00/09969 | 2/2000 |
| WO | WO 0060306 | 10/2000 |
| WO | WO 02057710 | 7/2002 |
| WO | WO 03/031903 | 4/2003 |
| WO | WO 2005/008171 | 1/2005 |
| WO | WO 2007/059353 | 5/2007 |
| WO | WO 2007/059354 | 5/2007 |
| WO | WO 2007/126960 | 11/2007 |

* cited by examiner

TAPE MEASURE

CROSS-REFERENCE TO RELATED APPLICATIONS

This application claims priority to U.S. Provisional Patent Application No. 61/513,283, filed on Jul. 29, 2011, U.S. Provisional Patent Application No. 61/607,060, filed on Mar. 6, 2012, and U.S. Provisional Patent Application No. 61/656,297, filed on Jun. 6, 2012, the entire contents of which are incorporated by reference herein.

BACKGROUND

The present invention relates to measurement devices, and in particular, the invention relates to a tape measure, and more specifically, a tape measure with a guard member.

SUMMARY

In one embodiment, the invention provides a tape measure. The tape measure includes a housing assembly defining a cavity and a tape port from which to extend and retract a measuring tape. The measuring tape forms a spool rotatably coupled about an axis. A hook member is fixedly coupled to an end portion of the measuring tape. A U-shaped guard member extends from the housing assembly adjacent the tape port. The guard member is configured to engage the hook member when the measuring tape is retracted into the housing assembly.

In another embodiment, the invention provides a tape measure. The tape measure includes a housing assembly defining a cavity and a tape port from which to extend and retract a measuring tape. The measuring tape forms a spool rotatably coupled about an axis. A hook member is fixedly coupled to an end portion of the measuring tape. A finger guard assembly extends from the housing assembly adjacent the tape port. The finger guard assembly includes a U-shaped guard member and a guard support member and is configured to engage the hook member when the measuring tape is retracted into the housing assembly.

Other aspects of the invention will become apparent by consideration of the detailed description and accompanying drawings.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

Figure 1:
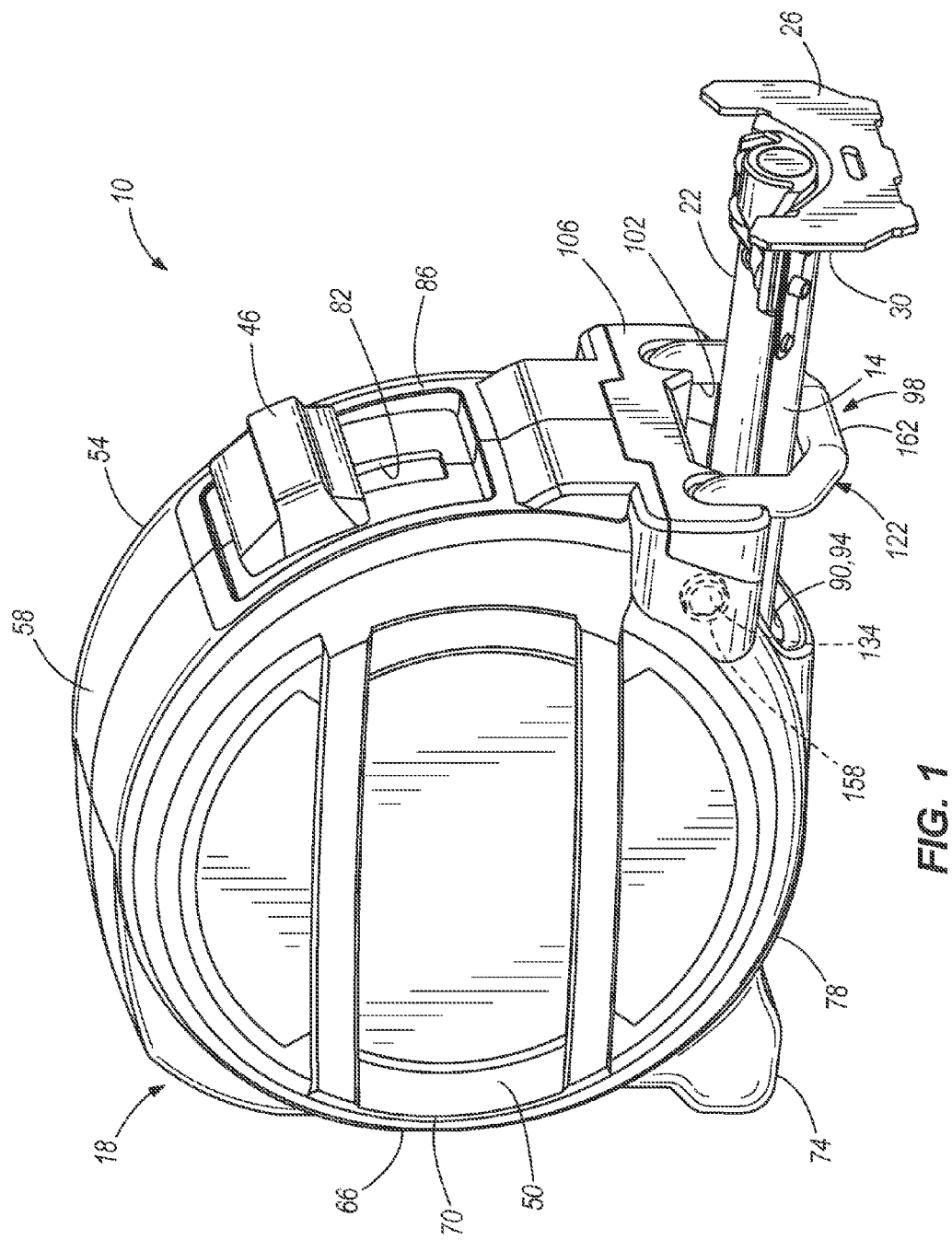
FIG. 1 is a perspective view of a tape measure according to one construction of the invention.
Figure 2:
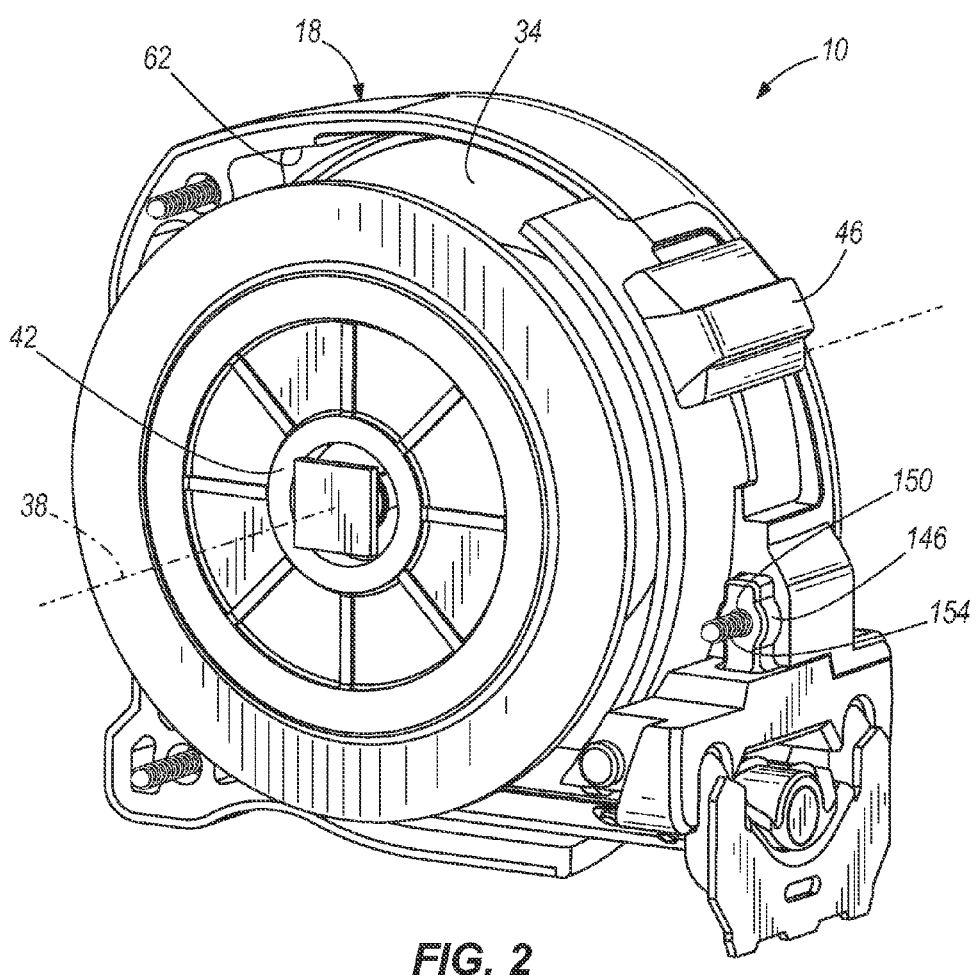
FIG. 2 is a perspective view of the tape measure of FIG. 1 with a first side wall removed.

FIGS. 1 and 2 illustrate a length measurement device, more specifically, a tape measure 10. The tape measure 10 includes a coilable measuring tape 14 and a housing assembly 18.

As illustrated in FIG. 1, a variable-length extended segment 22 of the measuring tape 14 is retractable and extendable from the housing assembly 18. A hook member 26 is fixedly coupled to an end portion 30 of the measuring tape 14. The remainder of the measuring tape 14 forms a spool 34 rotatably disposed about an axis 38 of the tape measure 10 (FIG. 2). As shown in FIG. 2, a refraction mechanism 42 is coupled to the spool 34 to provide for powered refraction of the measuring tape 14. The retraction mechanism 42 may include an elongated coiled spring for motive force. A tape lock 46 is provided to selectively engage measuring tape 14, such that the extended segment 22 of the measuring tape 14 remains at a desired length.

Referring to FIG. 1, the housing assembly 18 includes a first side wall 50, a second side wall 54, and a peripheral wall 58 connecting the first side wall 50 and the second side wall 54. The first side wall 50, second side wall 54, and peripheral wall 58 define an internal cavity 62 (FIG. 2) in which the spool 34 and retraction mechanism 42 are housed. Referring to FIG. 1, each of the first side wall 50 and the second side wall 54 has a substantially circular profile 66. In other embodiments, the side walls may be rectangular, polygonal, or any other desired shape. Portions of the housing assembly 18 may be co-molded or separately formed of a resilient material, such as a natural or synthetic rubber. In the illustrated construction, the housing assembly 18 is formed with housing bumpers 70 and a support leg 74 which extends from a lower portion 78 of the peripheral wall 58.

A slot 82 is defined along a forward portion 86 of the peripheral wall 58. The slot 82 is provided to allow for sliding movement of the tape lock 46 relative to housing assembly 18.

Below the slot 82, a tape port 90 is provided in the peripheral wall 58. The tape port 90 has an arcuate shape 94, corresponding to an arcuate cross-sectional profile of the measuring tape 14. The tape port 90 allows for the retraction and extension of the measuring tape 14 to and from the internal cavity 62 (FIG. 2).

Figure 3:
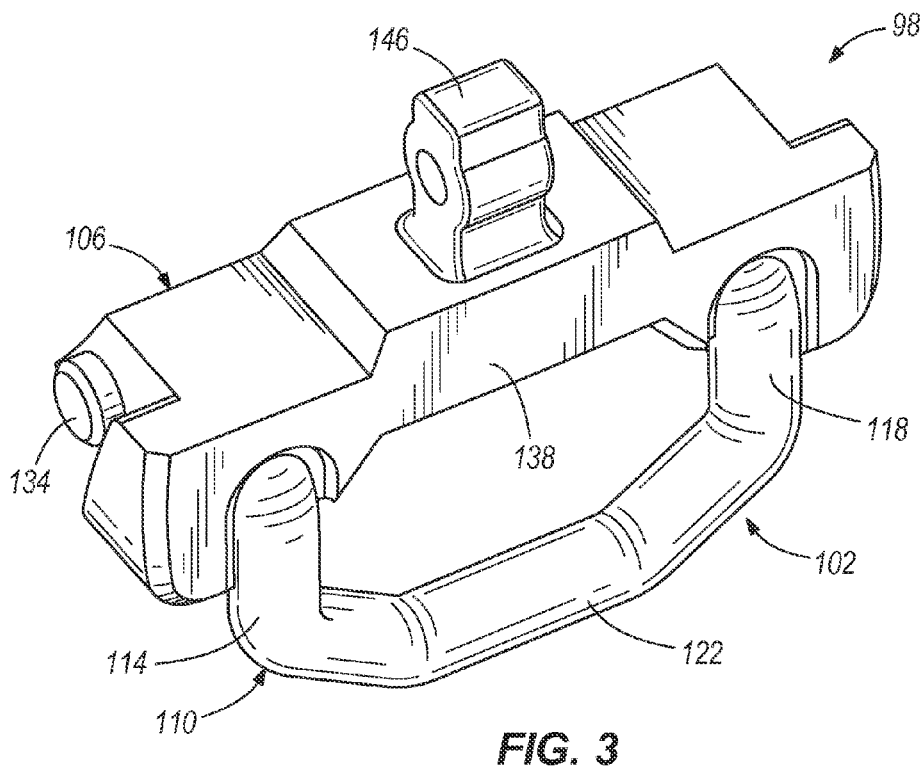
FIG. 3 is a perspective view of a finger guard assembly of the tape measure of FIG. 1.

As shown in FIGS. 1 and 2, the tape measure includes a finger guard assembly 98. Referring to FIG. 3, the finger guard assembly 98 includes a guard member 102 and a guard support member 106. Exposed portions 110 of the guard member 102 are substantially U-shaped, with a first leg 114 and a second leg 118 extending from the guard support member 106, and a connecting leg 122 extending between the first leg 114 and the second leg 118.

Figure 4:
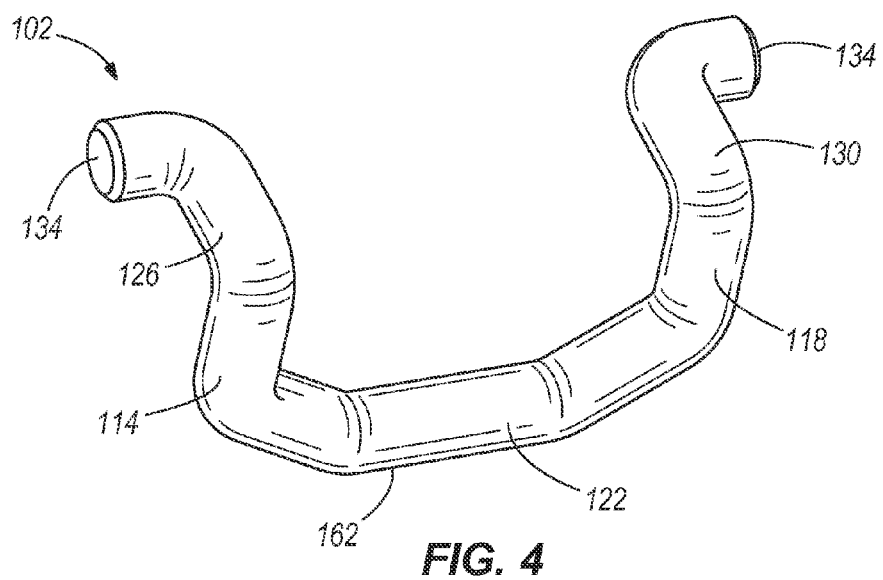
FIG. 4 is a perspective view of a finger guard of the finger guard assembly of FIG. 3.

Referring to FIG. 4, a first mounting extension 126 is coupled to the first leg 114, and a second mounting extension 130 is coupled to the second leg 118. Each of the first mounting extension 126 and the second mounting extension 130 includes a mounting boss 134. The guard member 102 may be formed of substantially rigid material such as a metal and is preferably coated or covered with a resilient material such as rubber or plastic. In other constructions, a resilient polymer or other material is used to form the guard member 102.

Referring to FIG. 3, the guard support member 106 is molded over the first mounting extension 126 and the second mounting extension 130 of the guard member 102, such that the exposed portions 110 of the guard member 102 extend from a forward surface 138 of the guard support member 106. The mounting bosses 134 extend outwardly from lateral edges 142 of the guard support member 106. In other constructions, other methods are used to connect the guard support member 106 and the guard member 102 (e.g., thermal bonding, adhesives, fasteners, etc.).

The guard support member 106 further includes a fastener boss 146. Referring to FIG. 2, the fastener boss 146 defines an aperture 150 for receiving a fastener 154 for coupling the guard support member 106 to the housing assembly 18. The boss 134 of each mounting extension 126 and 130 of the guard member 102 are received by corresponding recesses 158 (FIG. 1) formed in the housing assembly 18. The guard support member 106 may be formed of a resilient polymer or rubber material, such that the guard support member 106 provides a degree of impact resistance between the guard member 102 and the housing assembly 18 when the guard member 102 is struck by the hook member 26 or the tape measure 10 is dropped upon the guard member 102. Additionally, the guard support member 106 can rotate relative to the housing assembly 18 about the fastener 154 (FIG. 2) when an impact is received by the guard member 102.

Referring to FIG. 4, the guard member 102, and more specifically the connecting leg 122, is configured to engage the hook member 26 when the measuring tape 14 is fully retracted into the internal cavity 62 (FIG. 1). The guard member 102 also shields the housing assembly 18 from being struck by the hook member 26. In addition, a lower surface 162 of the guard member 102 is substantially aligned with the support leg 74, thereby allowing the tape measure 10 to stand upright on a surface to be measured as shown in FIG. 1.

Thus, the invention provides, among other things, a tape measure and more specifically a tape measure with a guard member. Although the invention has been described in detail with reference to certain preferred embodiments, variations and modifications exist within the scope and spirit of one or more independent aspects of the invention as described.

The invention claimed is:

1. A tape measure comprising:
a housing arranged to define an internal cavity, the housing defining a first tape port that provides a passageway between the internal cavity and an exterior of the housing;
a measuring tape rotatably supported in the internal cavity and including an end portion that is movable between a retracted position and an extended position;
a retraction mechanism disposed within the internal cavity and coupled to the measuring tape to bias the measuring tape toward the retracted position; and
a finger guard assembly coupled to the housing and including a guard and a guard support arranged to define a second tape port, the finger guard assembly arranged to inhibit movement of the end portion of the measuring tape into the first tape port when in the retracted position.

2. The tape measure according to claim 1, wherein the housing includes a first side wall, a second side wall, and a peripheral wall extending from the first side wall to the second side wall.

3. The tape measure according to claim 1, wherein the guard is permanently attached to the guard support and cannot be separated without damaging one of the guard and the guard support.

4. The tape measure according to claim 2, wherein the guard includes a first mounting boss positioned adjacent a first leg and a second mounting boss positioned adjacent a second leg, a portion of the first mounting boss being received in an aperture formed in the first side wall and a portion of the second mounting boss being received in an aperture formed in the second side wall.

5. The tape measure according to claim 4, wherein a connecting leg extends between the first leg and the second leg.

6. The tape measure according to claim 1, wherein the guard includes a lower surface aligned with a lower surface of the housing and configured to allow the tape measure to stand upright on a surface to be measured.

7. The tape measure of claim 1, wherein the guard is substantially U-shaped.

8. The tape measure of claim 1, wherein the U-shaped guard includes a metallic core and a resilient cover.

9. The tape measure of claim 1, further comprising a fastener positioned to attach the guard support to the housing.

10. The tape measure of claim 1, wherein the first tape port and the second tape port are spaced apart from one another to expose a portion of the measuring tape therebetween.

11. A tape measure comprising:
a measuring tape including an end portion;
a housing assembly defining a cavity and a tape port, the measuring tape arranged in a spool and disposed substantially within the cavity, the end portion extending through the tape port such that the measuring tape is extendable from a retracted position to an extended position;
a hook member coupled to the end portion;
a guard support member separate from and coupled to the housing assembly; and
a U-shaped guard member coupled to the guard support member and positioned adjacent the tape port, the guard member selectively engaging the hook member when the measuring tape is in the retracted position to inhibit passage of the hook member into the tape port.

12. The tape measure of claim 11, wherein the U-shaped guard member is formed from a substantially rigid material.

13. The tape measure of claim 11, wherein the U-shaped guard member includes a metallic core and a resilient cover.

14. The tape measure of claim 11, further comprising a fastener positioned to attach the guard support member to the housing assembly.

15. The tape measure of claim 11, wherein the guard member is permanently attached to the guard support member and cannot be separated without damaging one of the guard member and the guard support member.

16. The tape measure of claim 11, wherein the guard support member and the guard member cooperate to define a second tape port spaced apart from the first tape port.

17. The tape measure of claim 11, wherein the housing assembly includes a first side wall, a second side wall, and a peripheral wall that extends from the first side wall to the second side wall.

18. The tape measure of claim 11, wherein the guard member includes a first mounting boss positioned adjacent a first leg and a second mounting boss positioned adjacent a second leg, a portion of the first mounting boss being received in an aperture formed in the first side wall and a portion of the second mounting boss being received in an aperture formed in the second side wall.

19. The tape measure according to claim 18, wherein a connecting leg extends between the first leg and the second leg.

20. The tape measure according to claim 11, wherein the guard member includes a lower surface aligned with the housing assembly and configured to allow the tape measure to stand upright on a surface to be measured.

* * * * *